US006512442B1

(12) United States Patent
Taylor

(10) Patent No.: US 6,512,442 B1
(45) Date of Patent: Jan. 28, 2003

(54) APPARATUS FOR ASSISTING THE MANIPULATION OF OVERHEAD MOUNTED DEVICES BY A HANDLING TOOL

(75) Inventor: David G. Taylor, Thomasville, GA (US)

(73) Assignee: Taylor Maddox Technical, Inc., Thomasville, GA (US)

( * ) Notice: Subject to any disclaimer, the term of this patent is extended or adjusted under 35 U.S.C. 154(b) by 0 days.

(21) Appl. No.: 09/662,095

(22) Filed: Sep. 14, 2000

Related U.S. Application Data

(60) Provisional application No. 60/153,933, filed on Sep. 15, 1999.

(51) Int. Cl.[7] .......................... H01H 71/10; H02H 7/26

(52) U.S. Cl. ...................... 337/171; 337/172; 337/173; 361/115

(58) Field of Search ................................ 337/292, 159, 337/161, 162, 163, 164, 168, 169, 171–175, 186, 228, 229, 248, 251, 290; 361/102, 104, 115

(56) References Cited

U.S. PATENT DOCUMENTS

| | | | | | |
|---|---|---|---|---|---|
| 2,204,299 | A | | 6/1940 | Carlisle | 200/126 |
| 2,235,666 | A | | 3/1941 | Birkenmaier | 200/114 |
| 2,362,314 | A | * | 11/1944 | Schultz et al. | 337/156 |
| 2,816,979 | A | * | 12/1957 | Lindell | 337/139 |
| 4,123,639 | A | * | 10/1978 | Evans | 200/254 |
| 4,945,333 | A | * | 7/1990 | Stroud et al. | 337/176 |
| 5,502,427 | A | * | 3/1996 | Scherer et al. | 337/176 |
| 5,559,488 | A | * | 9/1996 | Hassler et al. | 337/158 |
| 5,670,927 | A | | 9/1997 | Fennell | 337/168 |
| 5,854,582 | A | * | 12/1998 | Clark et al. | 337/169 |
| 5,936,506 | A | * | 8/1999 | Hassler et al. | 337/171 |
| 5,998,748 | A | | 12/1999 | Taylor | 200/331 |

FOREIGN PATENT DOCUMENTS

| | | | | |
|---|---|---|---|---|
| CA | 508423 | | 12/1954 | |
| EP | 0676788 A2 | * | 10/1995 | H01H/85/042 |

* cited by examiner

*Primary Examiner*—Anatoly Vortman
(74) *Attorney, Agent, or Firm*—Baker, Donelson, Bearman & Caldwell

(57) ABSTRACT

A fuse cutout switch (12) attached to electrical distribution equipment mounted on poles of electrical distribution systems operable with hooksticks (16) in which a connection assembly (28) detachably engages a first distal end of a fuse body (20) that is pivotably and detachably engaged at a second distal end to a hinge (22). A grab member (32) attached to the fuse body (20) near the first distal end includes a receptacle (36) for selectively receiving the hookstick (16) for disengaging the fuse body (20) from the connection assembly (28). A restoring member (40) attached to the fuse body (20) near a second distal end has a receptacle (42) for selectively receiving the hookstick (16) for pivoting the fuse body (20) about the hinge (22) and engaging the fuse body (20) to the connection assembly (28). Various embodiments of the grab member and the restoring member are disclosed, together with methods of modifying existing fuse cutout switches and of operating a fuse cutout switch.

14 Claims, 5 Drawing Sheets

APPARATUS FOR ASSISTING THE MANIPULATION OF OVERHEAD MOUNTED DEVICES BY A HANDLING TOOL

The present application claims priority to provisional application Ser. No. 60/153,933, filed Sep. 15, 1999.

TECHNICAL FIELD

This invention relates to manually-operated overhead mounted devices such as pole-mounted fuses, cutout switches, and the like used by electric utilities in overhead electrical power distribution. More particularly, this invention relates to an improved switch arrangement that provides actuators for more efficient operational control of a removable switch or fuse body on such overhead mounted devices by handling tools

BACKGROUND OF THE INVENTION

Commercial and residential electrical power is distributed through electric cables which are supported along a series of power poles. Many of the poles are strategically mounted with interrupt assemblies or vertically mounted cutout assemblies. The cutout switch can be used to interrupt a connection to the transmission line, and may be connected to a transformer or another portion of the power distribution network.

Vertical cutouts include a combined switch and fuse element, which is pivotally mounted at one end in a hinge bracket usually located at the lower end of the cutout. The fuse element is typically a cylindrical fuse body that encases a fuse that connects electrically at distal ends with the electrical power lines. At its other end, the switch has a rounded cap that can be engaged in a recess of a contact plate, which is under spring pressure. The switch pivots with respect to the lower hinge bracket mounting, and the combined switch and fuse element constitutes a pivotal switch lever. Many cutout switches move to dropout position after a fuse blows. Thus, the fuse that needs replacement is readily identified, such as by a linesman driving along a roadway. Also, many of the devices may be operated manually by a lineman to interrupt the electrical circuit.

The switch and fuse body combination are typically fitted with a structural feature designed for cooperation with a handling tool, commonly referred to as hookstick. These hand-held hook sticks are typically 30 to 40 feet in length. The hookstick is operated by utility worker either on a pole, in a bucket truck, or on the ground. The typical structural feature that the hookstick cooperates with to operate the lever is a pull ring that extends from the end of the lever, The utility lineman inserts the hookstick into the pull ring and using the hookstick to actuate the lever by pressing against the pull ring with the hookstick.

The prior art hookstick-operated levers are difficult and cumbersome to operate because of the inadequate structural features provided for actuating the switch levers. Inserting the hookstick into the typical ring requires skill and patience. The difficulty of inserting the hookstick into the ring is further complicated by the conditions in which electrical system faults generally occur. High winds and lightning are leading causes of system faults. Therefore, a need to operate a cutout switch often arises during poor weather and at nighttime. Placing the hookstick into a small ring at the top of a utility pole is even more arduous a task in wet, windy, and dark conditions which may cause numerous failed attempts and become time consuming. Time is of the essence in restoration of electrical power. Moreover, safety of utility personnel is a significant concern. Failed attempts to insert a hookstick into a pull ring increase the personnel's exposure to weather conditions or electrical hazards. The prior art fails to address these problems associated with the hookstick operated cutout switches.

Accordingly, it is seen that a need remains for improved operational controllers of removable switches or fuse bodies on overhead mounted electrical distribution devices. It is to the provision of such therefore that the present invention is directed.

SUMMARY OF THE INVENTION

Accordingly, the present invention solves the deficiencies in prior art overhead mounted switches, fuse bodies, and cutout devices operated by hooksticks, by providing an improved operating actuators for fuse cutout switches attached to electrical distribution equipment mounted on poles of electrical distribution systems. The fuse cutout switch comprises a connection assembly for detachably engaging a first distal end of a fuse body and a hinge for pivotably and detachably receiving a second distal end of the fuse body. The actuators are a grab member and a restoring member. The grab member attached to the fuse body near the first distal end has an arm extending at an angle laterally therefrom and defines a receptacle at a distal end for selectively receiving a hookstick for disengaging the fuse body from the connection assembly. The restoring member attaches to the fuse body near the second distal end and has an arm extending at an angle laterally therefrom and defining a receptacle at a distal end for selectively receiving a hookstick for engaging the fuse body to the connection assembly. The grab member is engaged to move the fuse body from engagement with the switch while the opposing restoring member is engaged to remove and replace the fuse body from the hinge of the switch and to restore the fuse body into engagement with the switch.

In another aspect, the present invention provides a method of modifying existing fused cutout switches by attaching at the distal ends actuators comprising opposing arms that define receptacles for receiving hooksticks, for operation of the cutout switch.

In another aspect, the present invention provides a method of operating fused cutout switches attached to electrical distribution equipment mounted on poles of electrical distribution systems, comprising the steps of:

(a) engaging a hookstick in a receptacle of a grab member attached to a first end of a fuse body that is detachably engaged to a connection assembly of a fuse cutout switch; and (b) moving the hookstick to cause the first end of the fuse body to move outwardly from engagment with the connection assembly.

In a further aspect of this method, the fuse body is readily removed from the cutout switch by the steps of:

(c) pivoting the fuse body about a hinge engaged to a second end of the fuse body;

(d) engaging the hookstick in a receptacle of a restoring member attached at the second end of the fuse body; and (e) operating the hookstick to remove the fuse body from the hinge, whereby the fuse body is accessible for replacement of a fuse within the fuse body.

The fused cutout switch is restored to service by the steps of:

(f) engaging the hookstick in the receptacle of the restoring member;

(g) pivotally engaging the second end of the fuse body with the hinge; and (g) pivoting the fuse body about the hinge to engage the first end of the fuse body in the connection assembly.

Objects, features, and advantages of the present invention will become apparent upon reading of the following detailed description in conjunction with the drawings and the claims hereto.

DETAILED DESCRIPTION OF THE PREFERRED EMBODIMENTS

Figure 1:
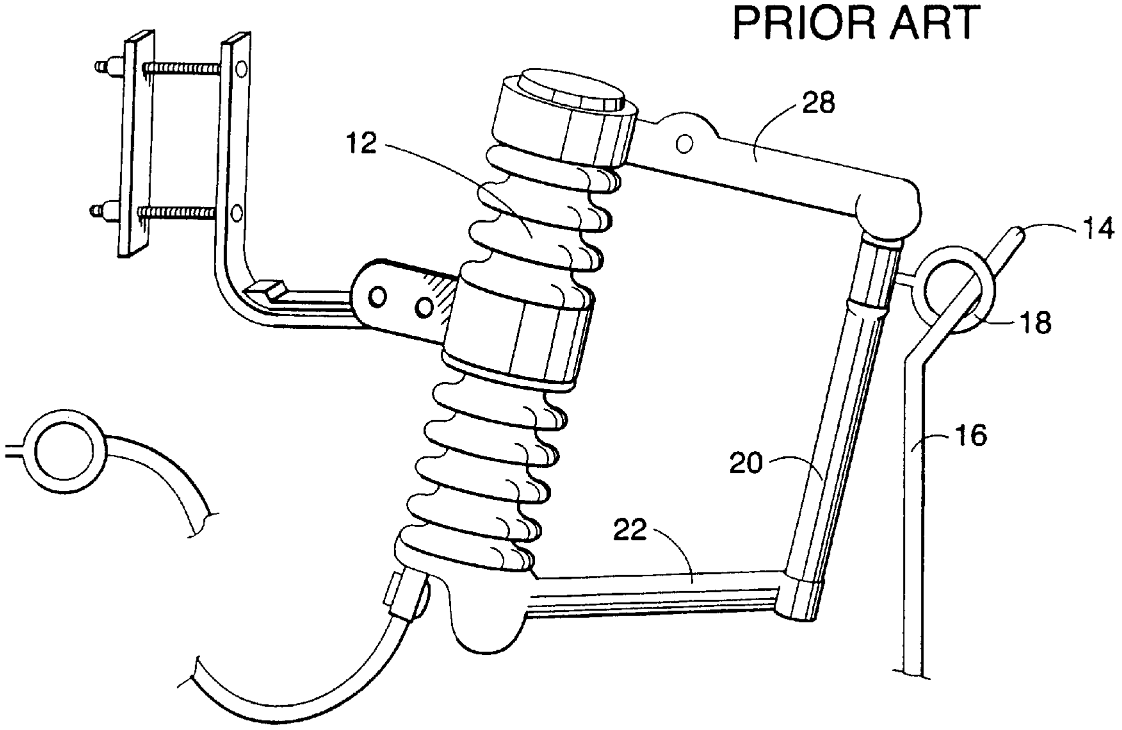
Fig. 1 PRIOR ART
FIG. 1 is a perspective view of a fused cutout assembly with a prior art pull ring feature and hookstick.

Referring to the drawings, FIG. 1 illustrates a mounted electrical distribution control device 12, which in the illustrated ebodiment is a vertical cutout and arrester combination that mounts conventionally on utility poles. These vertical cutout assemblies are also known as lockout devices or fused cutouts. As shown in FIG. 1, the fused cutout 12 is generally operated by manually placing a limb 14 that extends from a hookstick 16 into a pull ring 18 attached to a fuse body 20 in the cutout 12. The fuse body 20 contains a fuse for protecting the electrical distribution system from high voltage surges. Force is applied through the hookstick 16 against the ring 18 to operate the switch on the electrical distribution device. For example, a fuse body 20 is pivotally hinged by a hinge 22 generally at lower end bottom end 24 of the vertically mounted device 12. The pull ring 18 is attached to the top end of the fuse body 20. A top end 26 of the fuse body 20 is detachably connected to a connection assembly 28 that is generally at the top end of the cutout device 12.

The fuse body arrangement is typically referred to as a cutout switch 20, and the arrangement resembles a lever which is pivotable between a closed first position and a drop-down or open second position. The hookstick 16 is applied to the pull ring 18 to pivot the fuse body 20 about the hinge 22 in order to open or close the cutout switch 30. The pull ring 18 is pulled generally outwardly and downwardly towards the ground to open the cutout switch 30. The pull ring 18 is pulled in opposing directions, generally upwardly and inwardly, to engage the top end of the fuse body 20 to the connection assembly 28 and thereby close the cutout switch 30. Further, when the cutout switch 30 is open (or in a drop down position with the fuse body 20 hanging from the hinge 22), the hookstick 16 is inserted into the pull ring 18 to remove and replace the fuse body 20. This is accomplished by using the hookstick 16 in the pull ring 18 to lift the fuse body 20 from the hinge 22, so that the fuse body can be brought to the ground (or to a bucket on a boom-type service truck) for replacing the fuse within the fuse body 20. The fuse body 20 moves to a "drop-down" position as a result of the fuse becoming "blown" during an high voltage electrical surge through the fuse.

Figure 2:
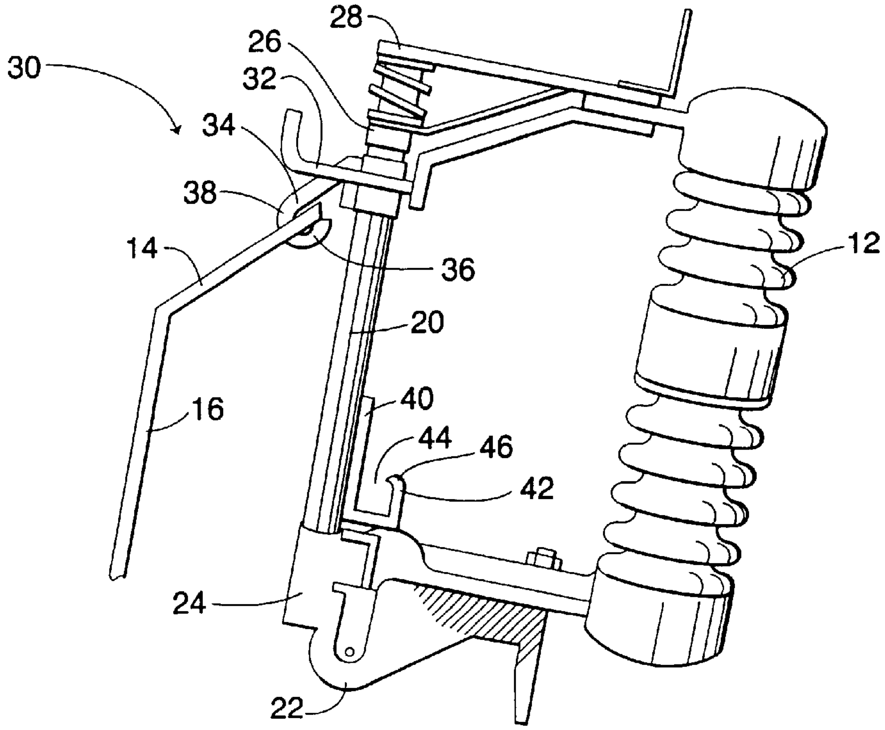
FIG. 2 is a perspective view of a fused cutout assembly shown with the fuse switch in the closed position and depicting the present invention as a structural improvement to the assembly replacing the prior art pull ring for operating the switch with a hookstick.

Referring further to FIG. 2, the actuator apparatus of the present invention is provided in a preferred embodiment adapted for use in the application of the mounted electrical distribution device 12, such as the fused cutout 30. In FIG. 2, the fused cutout switch 30 is in the closed position with the upper end of the switch being engaged with the connection assembly 28. As shown, the pull ring 18 of FIG. 1 is eliminated from the fuse body 20. In contrast, the present invention provides a grab member 32 that includes the features described herein for manipulation by a handling tool, such as the hookstick 16. The grab member 32 includes an extended portion 34 that is attached to the fuse body 20 preferably toward the top of the fuse body when the switch 30 is closed. The extended portion 34 of the grab member terminates in a receptacle 36 for receiving the limb 14 at the top of the hookstick 16. The receptacle 36 may be curved to provide a hook-shaped design. The receptacle 36 includes a receiving slot 38 sized such that the hookstick limb 14 fits into the receptacle. The receptacle 36 is positioned with sufficient space between an interior surface 37 and proximate features 39 of the switch 30 (such as the side of the fuse body 20) to permit the hookstick limb 14 to pass between the receptacle outer edges and the proximate features. Further, the receptacle 36 is oriented with the receiving slot 38 facing upwardly when the switch 30 is in the closed position shown in FIG. 2.

A restoring member 40 is provided for allowing further manipulation of the mounted device 12 using the hookstick 16 or other handling tool. As shown in the fused cutout device 12 of FIG. 2, the restoring member 40 is attached to the hinged end of the fuse body 20. The restoring member consists of an U-shaped receptacle 42 that provides an opening or slot 44 for receiving the limb 14 at the top of the hookstick 16. The restoring member 40 is provided for removing and replacing a fuse body 20 or other removable switch. When the switch 30 is in the closed position of FIG. 2, the receptacle of the restoring member 40 is oriented with the slot 44 facing upwardly. Thus, when the switch 30 drops down or is pivoted downwardly about the hinge 22, the receptacle 42 of the restoring member 40 becomes oriented with the slot 44 facing downwardly. Accordingly, the grab member 32 and the restoring member 40 are disposed at opposing ends of the fuse body 20, with the open slots in opposing facing relation.

Figure 3:
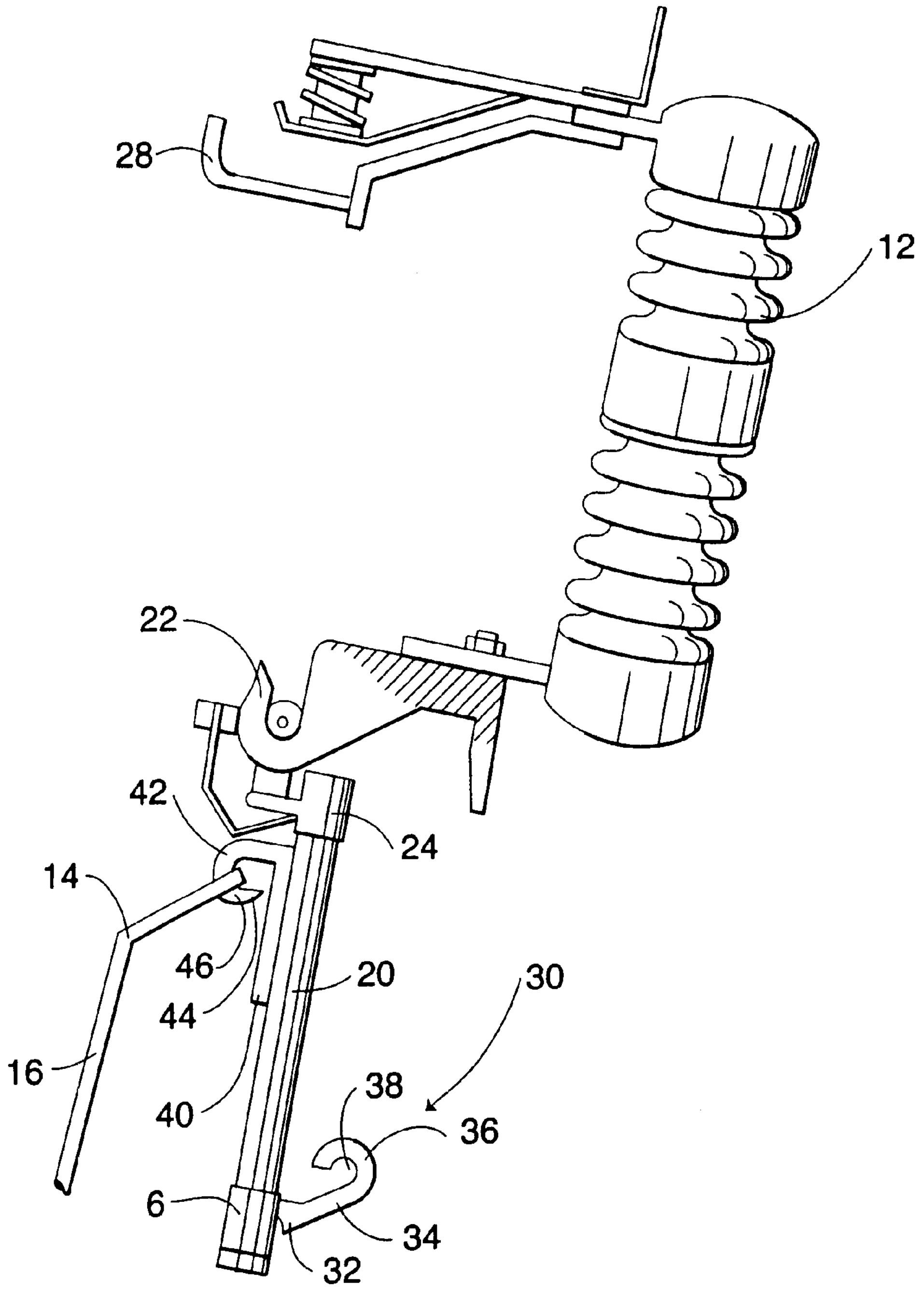
FIG. 3 is a perspective view of the present invention being used after opening the fuse switch to the open position to remove the fuse body from the supporting bracket.

FIG. 3 illustrates the mounted device 12 having a fused cutout switch 30 in the drop-down position, referred to as the open position. The open position will occur when a fuse in the fuse body 20 blows and the fuse body drops down out of the position of engagement with the connection assembly 28. Also, the open position could be caused by the manual operation of the switch 30 utilizing a handling tool 16. For example, the open position shown in FIG. 3 could be obtained by placing a hookstick 16 into the grab member 32 as depicted in FIG. 2. The hookstick 16 is placed in the grab member 32 by a utility worker lifting the limb 14 of the hookstick 16 above the receiving slot 38, and then moving the limb against the receptacle 36 and pulling the hookstick down to engage the grab member 32. Thereby, the receptacle 36 provided by the invention eliminates the fumbling caused by utility workers trying to place the limb 14 into the pull ring 18 at a remote distance, typically from about 30 to 50 feet away from the worker. After engaging the receptacle 36 with the hookstick 16, the utility worker pulls the switch 30 open by applying outward and downward force to the grab member 32.

When the fused cutout switch 30 is in the open position, the fuse body 20 may be removed and replaced by engaging the restoring member 40 with the hookstick 16. Again the inconvenience of the pull ring 18 is eliminated by the present invention. The utility worker engages the restoring member 40 by moving the hookstick limb 14 upwardly against the edges of the fuse body 20 and the restoring member 40 and into the open slot 44 of the downwardly facing receptacle 42. (This differs from the difficult actions necessary to place the limb 14 of the hookstick 16 into the small closed orifice of the pull ring 18 using horizontal motions of the limb controlled from the remote distance of 30 to 50 feet away by a utility worker.)

Once the hookstick 16 engages the restoring member 40, the utility worker lifts the fuse body 20 up out of the hinge 22. The barrel of the fuse body is opened (typically by unscrewing a cap), and the fuse contained therein is replaced.

To return the fuse body 20 to the switch 30, the utility worker places the fuse body on the end of the hookstick 16 by placing the limb 4 into the receptacle 32 of the restoring member 30. The hookstick 16 is then raised to lifting the fuse body 20 up above the hinge 22 and dropping the hinged end 24 of the fuse body 20 into the hinge 22. The hookstick 16 is then disengaged from the restoring member 40. The switch 30 is then closed. This is accomplished by engaging the hookstick 16 with the restoring member 32. The hookstick 16 is manipulated upwardly and inwardly to pivot the fuse body 20 about the hinge 22 to swing the fuse body into engaging contact with the connecting assembly 28 and thereby move the switch 30 into the closed position.

Both the grab member 32 and the restoring member 40 may be provided with means to enhance the secure engagement of the hookstick 16 with the receptacles 36 and 42. For instance, the terminal ends of the receptacles may include a lip 46 on one or both sides of the receiving slots 38 and 44 to hinder the hookstick limb 14 from slipping out of the receptacles while the mounted device 12 is manipulated.

Figure 4:
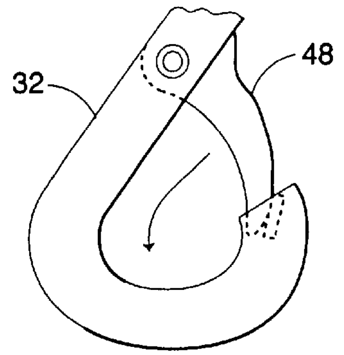
FIG. 4 is a side view of a further embodiment of the grab member of the present invention.
Figure 5:
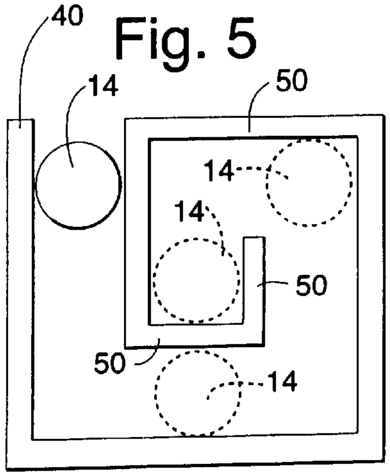
FIG. 5 is a side view of a further embodiment of the restoring member of the present invention.

Other embodiments of the invention are shown in FIG. 4 and FIG. 5. First, FIG. 4 illustrates that the grab member 32 or restoring member 40 of the invention may be provided with a spring loaded latch 48 that will be moved downward by the hookstick 16 and returned to its position to encircle the hookstick once the hookstick is engaged within the slot 38 or 44. Further, FIG. 5 illustrates that the grab member 32 or restoring member 40 of the invention may be spiraled or provided with additional flange members 50 to provide additional means for engaging the hookstick 16 such that the limb 14 may be encircled by the receptacles 36 and 42. Thereby, the receptacles 36 and 42 may encircle the limb 14 without the disadvantages of the prior art pull ring 18 that did not have an open body or slot 38 or 44 for receiving the limb 14 in both opening an overhead mounted switch 30 and in removing and replacing a fuse in the fuse body 20.

Figure 6:
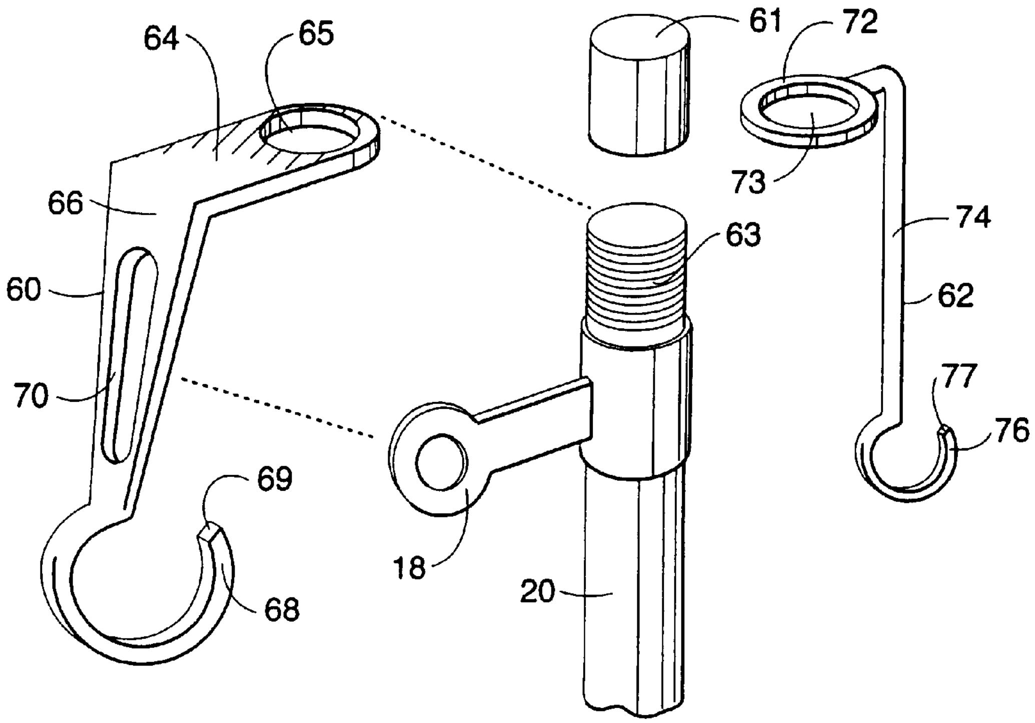
FIG. 6 is a perspective view of a fuse body with an alternate embodiment of a grabbing member and a restoring member according to the present invention.

FIG. 6 is a perspective exploded view of the fuse body 20 with the prior art ring 18 attached at an upper end and a threaded cap 61 exploded from the threaded end 63 of the fuse body. FIG. 6 illustrates alternate embodiments of a grabbing member 60 and a restoring member 62 according to the present invention, particularly suited for retrofit installation to an existing fuse body 20. The grabbing member 60 includes a mounting plate 64 that defines an opening 65 for the fuse body. An arm 66 extends at an angle from an outward edge of the mounting plate 64 and terminates in a hook-like receptacle 68 that defines a slot 69. The arm 66 defines an open, elongate slot 70. The slot 70 is sized for receiving therein the ring 18.

The restoring member 62 includes an annular mounting ring 72 that defines an opening 73 through which the thread end 63 of the fuse body 20 extends. An elongate arm 74 extends parallel to the fuse body 20. The arm 74 terminates in a hook-like receptacle 76. The receptacle 76 defines a slot 77 open generally upwardly and opposed to the receptacle 68 of the grabbing member 60.

Figure 7:
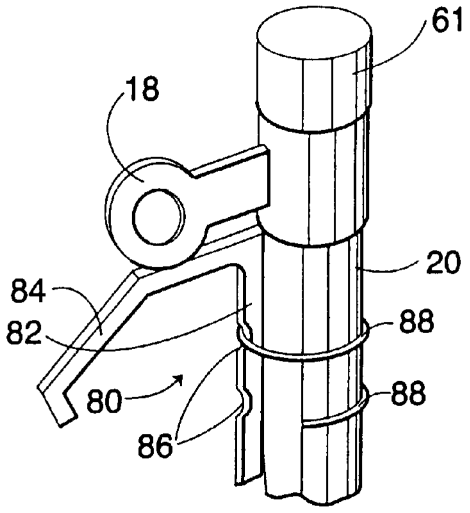
FIG. 7 is a perspective partial view of a fuse body with an alternate embodiment of a member that is used for either grabbing or restoring the fuse in an electrical switch.

FIG. 7 is a perspective partial view of the fuse body 20 and the ring 18, with an alternate embodiment of a member 80 that is used for either grabbing or restoring the fuse body 20 in an electrical switch. This embodiment of the member 80 is suited for retrofit applications. The member 80 comprises a hook-like body having a supporting portion 82 and an extending hook portion 84. A pair of spaced-apart notches 86 are defined in the supporting portion 82, which receive bands 88 for securing the member 80 to the fuse body 20.

Figure 8:
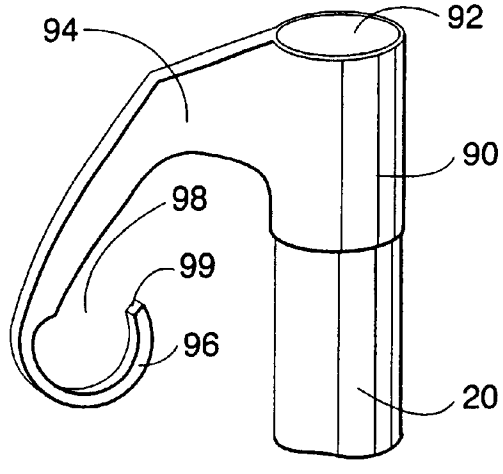
FIG. 8 is a perspective view of an alternate embodiment of a member that is used for either grabbing or restoring the fuse body in an electrical switch.

FIG. 8 is a perspective view of an alternate embodiment of a member 90 particularly adapted for installation by an original manufacturer of fuse bodies 20. The member 90 includes a cylindrical body 92 from which an arm 94 extends. The arm 94 terminates in a hook-like receptacle 96 which defines a slot 98 between the arm 94 and a distal end 99 of the arm.

Figure 9:
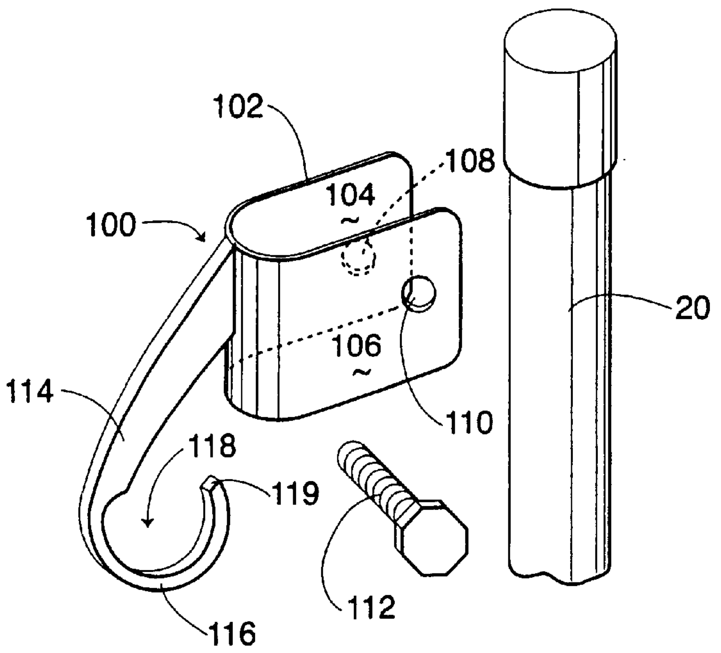
FIG. 9 is a perspective view of an alternate embodiment of a member that is used for either grabbing or restoring the fuse body in an electrical switch.

FIG. 9 is a perspective view of an alternate embodiment of a member 100 that is preferably installed as a retrofit application to existing fuse bodies. The member 100 includes a clevis or U-shaped yoke 102 with opposing sides 104, 106. The sides 104, 106 define aligned openings 108, 110 for receiving a fastener 112. The opening 108 in the side 104 may be tapped for threadingly engaging the fastener 112, or alternatively, a nut is provided (not illustrated) outwardly of the side, for securing the member 100 to the fuse body 20. An arm 114 extends at an angle from the yoke 102 and terminates in a hook-like receptacle 116. This defines a slot 118 between the arm 114 and a distal end 119 of the arm.

Figure 10:
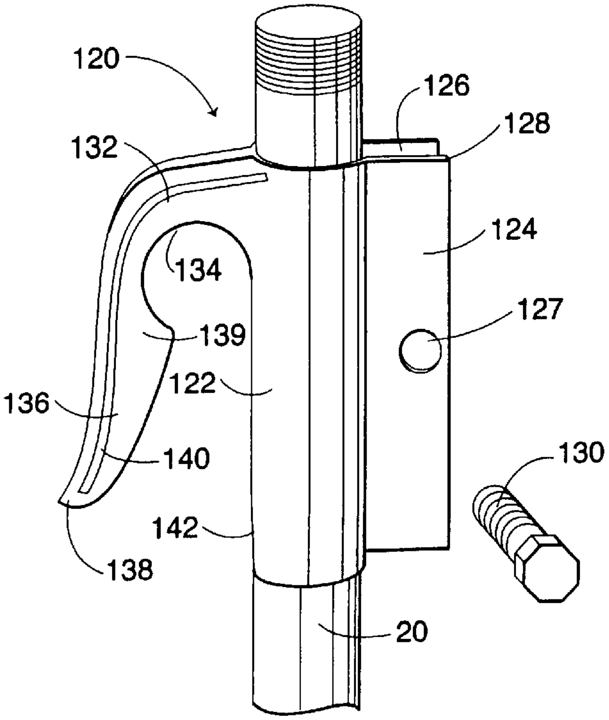
FIG. 10 is a perspective view of an alternate embodiment of a member that is used for either grabbing or restoring the fuse body in an electrical switch.

FIG. 10 is a perspective view of an alternate embodiment of a member 120 that is used for either grabbing or restoring the fuse body 20 in an electrical switch, and is adapted for retrofit application. The member 120 includes a yoke body 122 having opposing sides 124, 126 that cooperatively define an open slot 128 therebetween. The sides 124, 126 each define at least one aligned opening 127 for receiving a fastener 130. An arm 132 extends at an angle from the yoke 122 and defines a receptacle portion 134 on an interior face in cooperation with the yoke body 122. A distal portion 136 of the arm 132 terminates in an angled surface 138. An extended lip 139 defines a guard at a side portion of the receptacle 134. The opposing sides of the arm 132 includes a raised ridge 140, for rigidity of the arm. A tapered portion 142 is defined in the yoke opposing the arm 132.

Figure 11:
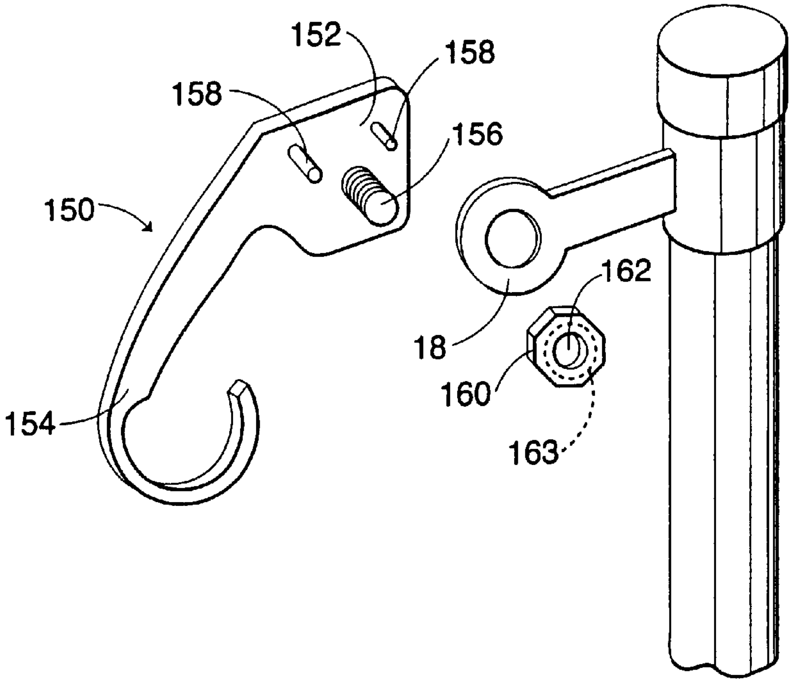
FIG. 11 is a perspective view of an alternate embodiment of a member that is used for either grabbing or restoring the fuse body in an electrical switch.

FIG. 11 is a perspective view of an alternate embodiment of a member 150 adapted for retrofit application to a switch 12 for use as a grabbing member. The member 150 comprises a plate with an attaching portion 152 and an extending arm portion 154. A threaded member 156 extends from the attaching portion 152 for extending through the ring 18 of the fuse body 20. A pair of pins 158 are spaced from the threaded member 156 for bearing against an exterior side of the ring 18, to secure the member in position and restrict rotation afer installation. A fastener 160 defines a threaded bore 162 for engaging the member 156. In a preferred ebodiment, the fastener 160 includes a boss 163, or raised portion, sized for being received within the ring 18.

The alternate embodiments illustrated in FIGS. 6, 7, 9, 10, and 11 are adapted for retrofit application to existing fuse bodies 20. However, these may be gainfully provided, as is the embodiment illustrated in FIG. 8, by manufacturers of fuse bodies. In an alternate embodiment (not illustrated), the angled arms that define the receptacles of the grab member and the restoring member are integral with the fuse body 20. In an alternate embodiment (not illustrated), the arm with the receptacle extends from the threaded cap that is used to close the fuse body 20.

With reference to FIG. 6, the threaded end 63 of the fuse body 20 passes through the respective openings 65, 73 in the grabbing member 60 and the restoring member 62. The threaded cap 61 secures the members 60, 62 to the fuse body 20. The slot 70 receives the ring 18. The arm 74 of the restoring member 62 is secured to the fuse body 20 by bands (not illustrated).

The operation of the switch 30 is provided by the hookstick 16 engaging the receptacle 68 and pulling outwardly and downwardly. The slot 69 provides an opening into the receptacle 68. This is accomplished readily by sliding the tip portion 14 of the hookstick 16 along the side of the fuse body 20 and the surface of the ring 18 to guide the hookstick 16 into the receptacle 68. After the fuse body 20 is moved to the drop-down position, the receptacle 76 is then engaged by the hookstick 16, to remove the fuse body 20 from the switch 30, as discussed above. The receptacle 76 is thereafter engaged by the hookstick to replace the fuse body 20 on the hanger 22 and to pivot the fuse body to the closed position.

The member 80 illustrated in FIG. 7 is employed gainfully as the grabbing member or the restoring member, with a pair of the members attached in opposing relation to the opposing distal end portions of the fuse body 20. As illustrated, the member 80 for a grabbing member is installed in contact with the existing ring 18. The bands 88 are preferably nylon straps, or other suitable fastener. The operation of the switch 30 using the members 80 as the grab member and the restore member is as discussed above relative to the other embodiments of the present invention.

The member 90 illustrated in FIG. 8 is particularly adapted for installation by an original manufacturer of fuse bodies. The cylindrical body 92 preferably force-fits or is otherwise secured to fuse body 20. The tip 14 of the hookstick 16 slides longitudinally along the side of the fuse body and returns along a lower surface of the arm 94 to enter the receptacle 96 through the slot 98, for grabbing and disengaging the fuse body 20 from the switch 30, in a manner like that discussed above.

The members 100 and 120 illustrated in FIGS. 9 and 10 are preferably installed as retrofit applications to existing fuse bodies. The fuse body 20 extends through the yokes, which are secured with the fasteners extending through the aligned openings in the sides. The operation of the switch by the hookstick entering the respective receptacle is in a manner like that discussed above. It is noted that the embodiment illustrated in FIG. 10 includes the tapered surface 142, for facilitating the guiding travel of the tip 14 along the fuse body and onto the surface of the yoke body 122 during operation of the switch.

The member 150 is preferably attached to the ring 18 in a retrofit application. The member 156 extends through the ring 18 while the pins 158 bear against the exterior of the ring. The fastener 160 threadably engages the member 156, while the boss 161 on the opposing face is received within the ring. The operation of the member 150 for grabbing the fuse body 20 in a switch is like that discussed above.

Accordingly, the present invention provides an improved and effective structure that makes the operation of cutout switches with hooksticks easier and faster while reducing the level of skill and patience necessary to place hooksticks into pull ring actuators. The present invention as disclosed herein results in an improved switch arrangement that provides operational control of cutout switches or fuse bodies by hookstick handling tools. The novel structural features of the apparatus include a grab member and a restoring member attached in opposing relation to the fuse body of the switch member of the mounted cutout device. The grab member and the restore member are readily manufactured by molding or fabricating from a plastics and other nonconductive electrically appropriate materials. Further, the present invention is readily installed as a retrofit application to existing installed cutout switches. Once the manipulating apparatus of the present invention is installed, the cutout switch may be operated without finding and placing the hookstick into a pull ring. Instead, the improved manipulating apparatus allows a lineman to engage the hookstick to the switch of the cutout device by sliding the hookstick into the slotted receptacle of the grab member or the restoring member, and moving the hookstick in the desired direction, to open or close the switch in order to remove or replace a blown fuse in the cutout device. Thus, the switch may be operated with less difficulty and engagement attempts with hooksticks with less precision than that needed for inserting hooksticks into prior art pull rings.

While the present invention has been described in detail with particular references to embodiments of apparatus for assisting the manipulation of overhead mounted electrical distribution devices by handling tools, it should be understood that many modifications, additions and deletions, in addition to those expressly recited, may be made thereto without departure from the spirit and scope of the invention as set forth in the following claims.

What is claimed is:

1. An actuator extending from a fuse body of a switch device of electrical distribution equipment mounted on poles of electrical distribution systems, comprising:

a member having a connector defined by a planar portion thereof with a threaded member extending laterally and a pair of pins spaced-apart therefrom at a first end of the member for attaching the member to a fuse body of a switch device;

a fastener for engaging the threaded member; and a receptacle defined at an opposing distal end of the member for receiving a hookstick therein, whereby the threaded member and the fastener, being engaged together while sandwiching a ring extending from a fuse body of switch device, communicates movement to the fuse body from a hookstick engaged in the receptacle for operating the switch device.

2. The actuator as recited in claim 1, wherein the receptacle defines a hook for receiving the hookstick.

3. The actuator as recited in claim 1, wherein a side wall of the receptacle defines a lip for restricting the hookstick from slipping out of the receptacle.

4. The actuator as recited in claim 1, wherein the member includes a second portion angling from the planar portion and the receptacle is defined at a distal end of the second portion.

5. An actuator extending from a fuse body of a switch device of electrical distribution equipment mounted on poles of electrical distribution systems, comprising:

a member defining an opening at a first end for receiving an end portion of a fuse body of a switch device;

a portion of the member intermediate the first end and an opposing distal end defining a slot for receiving a ring attached to the fuse body of the switch device; and a receptacle defined at an opposing distal end of the member for receiving a hookstick therein, whereby the member, being engaged to the fuse body and selectively engaged to the hookstick, is movable thereby to move the fuse body and operate the switch device.

6. The actuator as recited in claim 5, wherein the receptacle defines a hook for receiving the hookstick.

7. The actuator as recited in claim 5, wherein a side wall of the receptacle defines a lip for restricting the hookstick from slipping out of the receptacle.

8. The actuator as recited in claim 5, wherein the portion of the member extending from the opening to the distal end angles outwardly from the fuse body.

9. An actuator extending from a fuse body of a switch device of electrical distribution equipment mounted on poles of electrical distribution systems, comprising:

a member defining an opening at a first end for receiving a bolt for attaching the member to a fuse body of a switch device;

a pair of pins spaced from the opening for bearing against respective side walls of a nut engaged to the bolt, whereby the member is restricted from pivoting relative to the fuse body when the receptacle is engaged to the hookstick; and a receptacle defined at an opposing distal end of the member for receiving a hookstick therein, whereby the member, being engaged to the fuse body and selectively engaged to the hookstick, is movable thereby to move the fuse body and operate the switch device.

10. The actuator as recited in claim 9, wherein the receptacle defines a hook for receiving the hookstick.

11. The actuator as recited in claim 9, wherein a side wall of the receptacle defines a lip for restricting the hookstick from slipping out of the receptacle.

12. The actuator as recited in claim 1, wherein the portion of the extending from the opening to the receptacle extends away from the fuse body at an oblique angle.

13. An actuator extending from a fuse body of a switch device of electrical distribution equipment mounted on poles of electrical distribution systems, comprising:

a member having a planar portion with a threaded member extending laterally and a pair of pins spaced-apart therefrom, the member being engagable by a hookstick handled from a position remote from the switch device for operation thereof;

a fastener that engages the threaded member, whereby the threaded member and the fastener connect together sandwiching therebetween a ring extending from a fuse body of a switch device;

the member defining an operating arm in a portion that extends at an oblique angle relatively openingly away from the fuse body, thereby defining a taperingly narrowing gap between an interior face of the member and the fuse body, said gap being wider at an opening towards the remote position for operation of the switch device; and a receptacle defined in the operating arm for receiving the hookstick therein, whereby the member, being engaged to the fuse body and selectively engaged to the hookstick, is movable thereby to move the fuse body and operate the switch device.

14. The actuator as recited in claim 13, wherein the receptacle defines a hook for receiving the hookstick.

* * * * *

UNITED STATES PATENT AND TRADEMARK OFFICE

CERTIFICATE OF CORRECTION

PATENT NO. : 6,512,442 B1
DATED : January 28, 2003
INVENTOR(S) : David G. Taylor It is certified that error appears in the above-identified patent and that said Letters Patent is hereby corrected as shown below:

Column 10,
Line 16, insert the word -- member -- before the word "extending".

Signed and Sealed this

Twenty-fourth Day of June, 2003

JAMES E. ROGAN
*Director of the United States Patent and Trademark Office*